United States Patent
Wiertz

(10) Patent No.: US 8,141,738 B2
(45) Date of Patent: Mar. 27, 2012

(54) SYSTEM FOR INSULATING A CRYOGENIC TANK AND METHOD OF INSULATING SAID TANK

(75) Inventor: Thierry Wiertz, Claix (FR)

(73) Assignee: L'Air Liquide Societe Anonyme pour l'Etude Et l'Exploitation des Procedes Georges Claude, Paris (FR)

(*) Notice: Subject to any disclaimer, the term of this patent is extended or adjusted under 35 U.S.C. 154(b) by 559 days.

(21) Appl. No.: 12/304,657

(22) PCT Filed: Apr. 16, 2007

(86) PCT No.: PCT/FR2007/051117
§ 371 (c)(1),
(2), (4) Date: Dec. 12, 2008

(87) PCT Pub. No.: WO2007/144525
PCT Pub. Date: Dec. 12, 2007

(65) Prior Publication Data
US 2009/0321452 A1  Dec. 31, 2009

(30) Foreign Application Priority Data
Jun. 14, 2006 (FR) .................................. 06 52128

(51) Int. Cl.
*F17C 1/12* (2006.01)

(52) U.S. Cl. .......................... 220/560.12; 220/560.15

(58) Field of Classification Search ............ 220/560.12, 220/560.15, 560.08, 560.09, 592.27
See application file for complete search history.

(56) References Cited

U.S. PATENT DOCUMENTS

| 3,107,498 | A | * | 10/1963 | Messer ........................... 62/45.1 |
| 3,358,463 | A | * | 12/1967 | Hawkins et al. ............... 62/51.1 |
| 3,622,030 | A | * | 11/1971 | Yamamoto ............... 220/560.06 |
| 3,935,957 | A |   | 2/1976 | Hasegawa |
| 4,116,150 | A |   | 9/1978 | McCown |
| 4,170,952 | A |   | 10/1979 | McCown |
| 4,215,798 | A | * | 8/1980 | Patterson et al. ......... 220/560.12 |
| 4,640,437 | A | * | 2/1987 | Weingartner ............ 220/560.12 |
| 4,683,880 | A | * | 8/1987 | Werjefelt .................. 128/201.28 |
| 4,977,952 | A | * | 12/1990 | Schatz ............................ 165/10 |
| 6,378,722 | B1 | * | 4/2002 | Dhellemmes ................. 220/586 |

FOREIGN PATENT DOCUMENTS

FR  2 535 831  5/1984

OTHER PUBLICATIONS

International Search Report for PCT/FR2007/051117.

* cited by examiner

*Primary Examiner* — Stephen Castellano
(74) *Attorney, Agent, or Firm* — Christopher J. Cronin

(57) ABSTRACT

Cryogenic tank insulation system comprising blocks of insulating materials placed, at low temperature, so as to be essentially touching on one face of the structure of said tank, the blocks being placed between said face of the structure and an impervious deformable wall which defines at least one portion of the volume where the cryogenic fluid is stored and is actuated by return means for returning it to the face of the structure, characterized in that a first portion of the blocks is at ambient temperature in contact with the face of the structure and away from the impervious deformable wall, a second portion of the blocks being at ambient temperature, in contact with the impervious deformable wall and away from the face of the structure, the edges of the blocks of the first portion; and those of the second portion being, at ambient temperature, in partial contact and having complementary shapes so as to form an essentially continuous layer of insulating material at low temperature.

15 Claims, 2 Drawing Sheets

SYSTEM FOR INSULATING A CRYOGENIC TANK AND METHOD OF INSULATING SAID TANK

CROSS-REFERENCE TO RELATED APPLICATIONS

This application is a §371 of International PCT Application PCT/FR2007/05117, filed Apr. 16, 2007.

BACKGROUND

The present invention relates to a system for insulating a cryogenic tank, such as a tank for space launchers or any other tank capable of containing a cryogenic fluid, such as notably a fixed storage tank, a tanker truck or a vehicle tank.

The use of cryogenic fluids for launchers of a space vehicle has particular interest since it makes it possible to employ liquid combustibles and fuels, notably for launching and maneuvering these machines. Moreover, these fluids are the subject of many developments for the propulsion of land vehicles.

Fluids capable of being contained in such tanks are, for example, hydrogen, oxygen, natural gas and ethylene. These fluids are stored in the liquid state at a very low temperature, for example hydrogen at below −252° C., oxygen at below −183° C., and natural gas at below −162° C., while the ambient temperature outside the tank is generally around 20° C.

The quantity of fluids necessary, notably for the propulsion of spacecraft, generally determines the form of tanks so that they are carefully adapted to the craft and these tanks constitute a very important part of the whole.

In order to maintain the fluid contained in the tank in the liquid state, the walls of the tank have to be insulated. Insulating materials are thus positioned between the structure of the tank, generally the outer wall of the tank, and the volume where the cryogenic fluid is stored.

Such a tank is for example described in U.S. Pat. No. 3,935,957 where the thermal insulating material is positioned between two walls.

An insulating material used in a known manner consists of a rigid cellular foam with a high proportion of closed cells, for example polyvinylchloride (PVC) or polyurethane (PU) notably with densities of which the order of magnitude is situated between 30 kg/m$^3$ and 80 kg/m$^3$. Reference is made by way of examples to the following commercial products: Airex® C71.55, Diab Divynicell® HP50, Puren® P 60 T.

It is usually considered that these materials constitute the best compromise in the terms of mass necessary for insulation, thermal performance, and ease of application, notably by adhesive bonding to the structure of the tank.

It should also be noted that the insulation, positioned inside or outside the tank, should be impervious in order to prevent cryogenic pumping of gas into the volume of the insulated material. To date, many materials have not been employed for thermal insulation of a cryogenic tank since they are not impervious.

It will be noted moreover that insulating materials used should have sufficient mechanical strength so as not to crack under stress fields induced by differential expansion between the structure of the tank and the insulating material, during filling or discharging cycles of the tank. Many materials crack or crumble when they are subjected to such temperature cycles and to the resulting high thermal gradients.

The result is that at the present time only a very limited number of insulating materials is employed for insulating cryogenic tanks.

U.S. Pat. No. 4,116,150 describes an insulating system according to the preamble of claims 1 and 13.

SUMMARY OF THE INVENTION

The object of the present invention is to provide an insulating system which would enable a large variety of insulating materials to be employed for the purpose of insulating cryogenic tanks.

This object is achieved by means of a system for insulating a cryogenic tank comprising blocks of insulating materials disposed, at a low temperature, in a substantially abutting manner on one face of the structure of said tank where the blocks are disposed between said face of the structure and a deformable impervious wall, which delimits at least part of the volume where the cryogenic fluid is stored, and is actuated by return means towards the face of the structure, a first part of the blocks being, at ambient temperature, in contact with the face of the structure and away from the deformable impervious wall, the second part of the block being, at ambient temperature, in contact with the deformable impervious wall and away from the face of the structure, the edges of the blocks of the first part and those of the second part being, at ambient temperature, in partial contact or having complementary shapes so as to form a substantially continuous layer of insulating material at a low temperature.

In this way it is possible to distinguish the function of impermeability, which is advantageously provided by the deformable impervious wall situated on the side where the cryogenic fluid is stored, from the thermal insulating function provided by the insulating material held between the structure and this deformable impervious wall. By virtue of this arrangement, it is possible to use insulating materials that are not impervious. As examples, mention may be made of polyetherimide (PEI) that is not impervious to helium (notably Airex® R-82), polyimides (PI) that are not totally impervious (notably Solrex® from Sordal) and polymethacrylimides (PMI) that are sensitive to moisture take-up and are not impervious to gases (notably Rohacell® 51 WF from Röhm). These materials have mechanical properties and/or an advantageously high-temperature stability compared with products currently used. Moreover, the chosen arrangement of blocks of insulating materials is particularly advantageous since it makes it possible to reduce very substantially the stresses applied during thermal cycles and in this way to reduce very considerably the risks of cracking or crumbling of blocks of insulating materials.

Within the context of the invention, the “structure” of the tank is understood to mean a wall, generally metallic, in contact with which the low-temperature insulating materials are disposed. This structure is frequently the outer envelope of the tank.

“Low temperature” is understood to mean the situation where the tank contains a cryogenic fluid, that is to say where the inner tank face is close to the temperature at which the cryogenic fluid is stored, typically between −150° C. and −250° C. “Partial contact” is understood to mean contact between the edges of insulating blocks that is only made over part of the edge, that is to say either a point contact, for example on a sharp projection of a block, or over only part of the thickness of a block. “Complementary shape” is understood to mean shapes capable of fitting together, so as to enable the edges of two contiguous blocks to contact at each other at a low temperature over substantially all their surface area.

According to one embodiment, means for returning the deformable impervious wall consist of a difference in pressure between the interior of the cryogenic tank and the space where blocks of insulating materials are disposed, notably by making a vacuum in this space.

It is also possible to envisage return means that could provide a deformable impervious wall under stress, or actuation of this wall, notably by motorized means.

According to another embodiment, the blocks of insulating materials are substantially parallelepipedal, notably polygonal.

Advantageously, the first part of the blocks in contact with the face of the structure is adhesively bonded to said face of the structure.

According to an embodiment, the deformable impervious wall consists of a polymeric film, for example polyimides (PI), notably products marketed by DuPont such as Kapton® or UBE Upilex®. Use of a sheet of thin metal may also be envisaged so as to constitute this wall.

Advantageously, the first part of the blocks of insulating materials forms a frame within which the second part of the blocks of the insulating materials is inserted. It is then possible notably to position the first part of the block of insulating materials in the form of strips or grids.

According to an embodiment of the invention, the edges with complementary shapes are shaped in a bevel. The bevel may be situated over all or part of the shaped edge. It is also possible to envisage edges with a rounded shape over all or part of the edge.

Advantageously, the first part of the blocks of insulating materials has edges shaped in a bevel at an angle $\alpha$, and the second part of the blocks of insulating materials has edges shaped in a bevel at an angle $\beta$, where $\alpha$ is greater than $\beta$. As an example, $\alpha=60°$ and $\beta=50°$ to $55°$, according to the dimensions of the blocks and the expansion properties of the material. The difference between the angles $\alpha$ and $\beta$ is for example between 5° and 10°. It is therefore possible to take into account variations in shape linked to expansion of the blocks. In this way, stresses applied to the blocks are further reduced, making it possible to limit still further the risks of deterioration of the blocks.

Advantageously, the second part of the blocks of insulating materials has principal faces that are bowed at ambient temperature, having a concave curvature with respect to the structure. The faces of a block of insulating material in contact with, or parallel to, the structure at a low temperature are called the "principal faces". This embodiment is notably advantageous for thick blocks of insulating materials and makes it possible to reduce stresses at low temperature. Indeed, when the system is cooled, the thermal gradient of these blocks will be able to induce an inverse bowing or pre-bowing effect. In this way, pre-bowing combined with deformation of the panel will improve still further the way the panels are fitted together.

According to another embodiment, the structure of the tank has an impervious film in contact with which the first part of the blocks of insulating materials are disposed. In this way, it is possible to use a structure comprising a non-impervious wall, imperviousness of the structure being ensured by the impervious film.

According to an advantageous embodiment, the system includes a pumping port designed to create a vacuum between the structure of the cryogenic tank and the deformable impervious wall. The pumping port may be connected from time to time or continuously to a pumping device.

According to an embodiment, the insulating system has flanges at its ends that connect the structure and the deformable impervious wall together. The flanges enable the volume that contains the blocks of insulating materials to be closed. In this way it is possible to ensure continuity between several segments of the same cryogenic tank or the provision of interfaces (filling, emptying etc.) or of manholes.

The present invention also relates to a method for insulating a cryogenic tank comprising the following steps:
putting the structure of the tank in place,
placing a first part of the blocks of insulating materials on the structure,
placing, on the first part of the blocks of insulating materials, a second part of the blocks of insulating materials in partial contact with said first part of the blocks, where the edges of the first part and those of the second part have complementary shapes,
placing a deformable impervious wall on the second part of the blocks of insulating materials,
actuating the return means, notably by creating a vacuum, between the structure of the tank and the deformable impervious wall so as to form a substantially continuous layer of insulating materials at a low temperature.

BRIEF DESCRIPTION OF THE FIGURES

The invention will be described in detail hereinafter with the aid of non-limiting examples illustrated by the following figures.

DETAILED DESCRIPTION OF THE INVENTION

Figure 1:
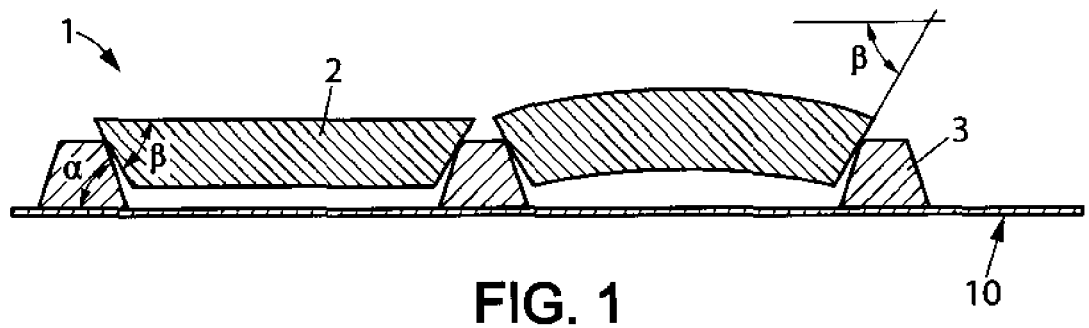
FIG. 1 is a partial sectional view of the arrangement of blocks at ambient temperature.

FIG. 1 shows a partial view of the arrangement of blocks of insulating materials at room temperature in the insulating system 1 of the cryogenic tank according the invention. In this embodiment, a first part 3 of the blocks is adhesively bonded to one face of the structure 10 of the tank.

A second part 2 of the blocks is placed in partial contact on the first part 3 of the blocks. In this embodiment, the edges of the blocks 2, 3 are shaped in a bevel and the angle $\alpha$ of the bevels of the block 3 is greater than the angle $\beta$ of the bevels of the blocks 2. Contact between the blocks 2, 3 is made between the end of the edges of the blocks 3 and a point of the beveled edge of the blocks 2. One of the blocks 2 is shown with two principal flat parallel faces according to one embodiment of the invention. The other block 2 is shown with two principal parallel faces bowed at room temperature, having a concave curvature with respect to the structure 10.

Figure 2:
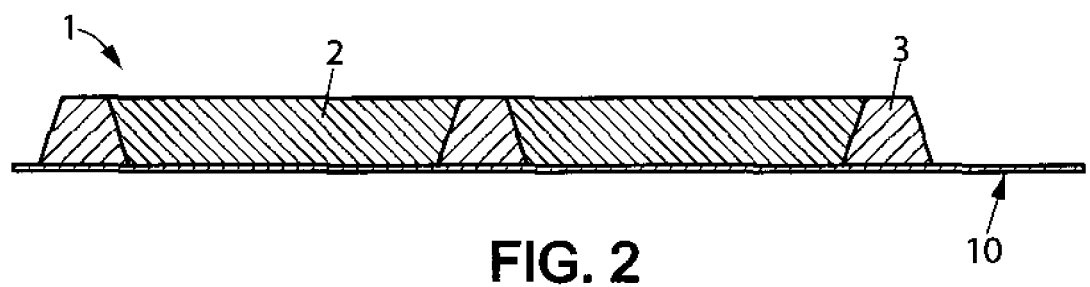
FIG. 2 is a partial sectional view of the arrangement of blocks at a low temperature.

FIG. 2 shows the same embodiment of that of FIG. 1 when the cryogenic fluid is introduced into the tank. On account of the very high temperature gradient between the outer face of the structure 10 (substantially at ambient temperature) and the opposite face in contact with the cryogenic fluid, the blocks 2, 3 deform in relation to FIG. 1. The shapes of the blocks are designed so that the blocks form a layer of substantially continuous insulating material at a low temperature. The parameters enabling such blocks to be designed are known to a person skilled in the art and take into account notably the dimensions of the blocks, and the coefficient of expansion of the insulating material used.

Figure 3:
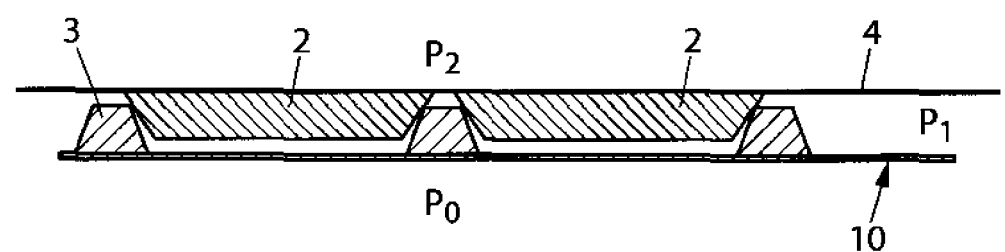
FIG. 3 is a partial sectional view of an insulating system according to the invention.

FIG. 3 shows a partial sectional view of an insulating system according to the invention at ambient temperature where the film 4 is disposed on the blocks 2, 3 shown in FIG. 1. The outside of the tank is at atmospheric pressure $P_0$, the inside of the reservoir at a pressure $P_2$, in general close to atmospheric pressure and the space between the structure 10 and the film 4 is put under vacuum at the residual pressure $P_1$.

Figure 4:
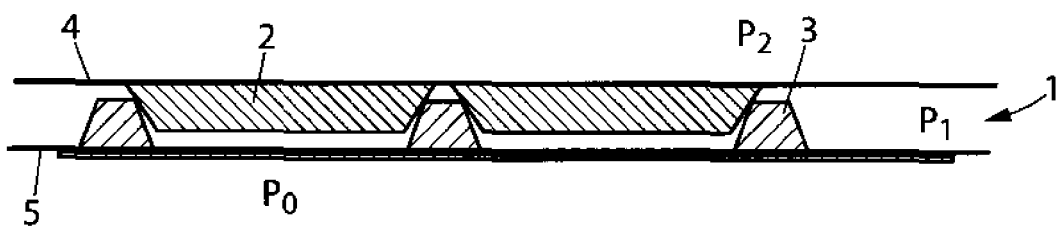
FIG. 4 is a partial sectional view of another embodiment of the insulating system according to the invention.

FIG. 4 shows another embodiment where, in addition to the elements of FIG. 3, an impervious film 5 is added against the outer wall of the tank. The film 5 and said wall form the structure 11. The blocks 3 are placed in contact with this film. It is therefore possible to use an outer porous wall, which is advantageous in terms of the ease of choosing the material and of cost.

Figure 5:
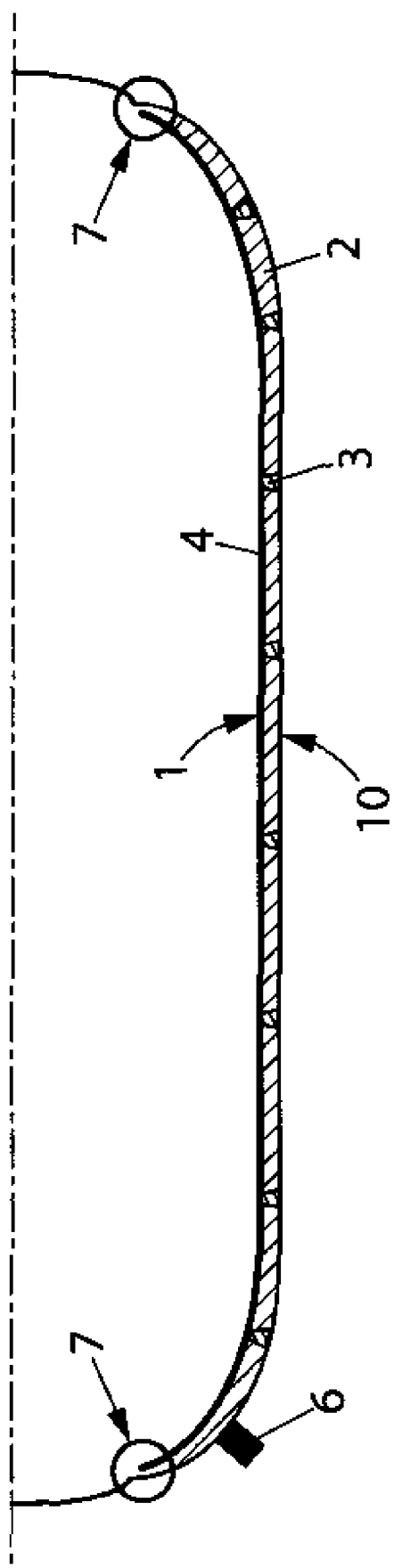
FIG. 5 is a partial sectional view of a cryogenic tank having the insulating system according to the invention.

FIG. 5 shows a partial sectional view of a cryogenic tank having the insulating system 1 according to the invention, where the blocks 2, 3 of insulating materials are disposed between a structure 10 and a film 4. This representation shows the tank at a low temperature. The tank is a cylinder of which the axis is shown. The ends of the tank are curved plates to which the flanges 7 are fixed with a seal that ensures imperviousness between the structure 10 and the film 4. A pumping port 6 is disposed on the structure 10 so as to be able to put it under total or partial vacuum between the structure 10 and the film 4.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An insulating system for a cryogenic tank comprising blocks of insulating materials disposed, at a low temperature, in a substantially abutting manner on one face of a structure of said tank, the blocks being disposed between said face of the structure and a deformable impervious wall, the deformable and impervious wall delimiting at least part of the volume where the cryogenic fluid is stored and being actuated towards the face of the structure, characterized in that a first part of the blocks is, at ambient temperature, in contact with the face of the structure and away from the deformable impervious wall, a second part of the blocks being, at ambient temperature, in contact with the deformable impervious wall and away from the face of the structure, the edges of the blocks of the first part and those of the second part being, at ambient temperature, in partial contact and having complementary shapes so as to form a substantially continuous layer of insulating material at a low temperature, wherein the first part of the blocks of insulating materials has edges shaped in a bevel at an angle $\alpha$, the second part of the blocks of insulating materials has edges shaped in a bevel at an angle $\beta$, where $\alpha$ is greater than $\beta$.

2. An insulating system for a cryogenic tank comprising blocks of insulating materials disposed, at a low temperature, in a substantially abutting manner on one face of a structure of said tank, the blocks being disposed between said face of the structure and a deformable impervious wall, the deformable and impervious wall delimiting at least part of the volume where the cryogenic fluid is stored and being actuated towards the face of the structure, characterized in that a first part of the blocks is, at ambient temperature, in contact with the face of the structure and away from the deformable impervious wall, a second part of the blocks being, at ambient temperature, in contact with the deformable impervious wall and away from the face of the structure, the edges of the blocks of the first part and those of the second part being, at ambient temperature, in partial contact and having complementary shapes so as to form a substantially continuous layer of insulating material at a low temperature, wherein:
the edges with complementary shapes are shaped in a bevel; and
the first part of the blocks of insulating materials has edges shaped in a bevel at an angle $\alpha$, the second part of the blocks of insulating materials has edges shaped in a bevel at an angle $\beta$, where $\alpha-\beta=5°$ to $10°$.

3. An insulating system for a cryogenic tank comprising blocks of insulating materials disposed, at a low temperature, in a substantially abutting manner on one face of a structure of said tank, the blocks being disposed between said face of the structure and a deformable impervious wall, the deformable and impervious wall delimiting at least part of the volume where the cryogenic fluid is stored and being actuated towards the face of the structure, characterized in that a first part of the blocks is, at ambient temperature, in contact with the face of the structure and away from the deformable impervious wall, a second part of the blocks being, at ambient temperature, in contact with the deformable impervious wall and away from the face of the structure, the edges of the blocks of the first part and those of the second part being, at ambient temperature, in partial contact and the edges of the blocks of the first part having shapes complementary to those of the blocks of the second part so as to form a substantially continuous layer of insulating material at a low temperature, wherein:
each of the blocks of the first part is in contact with the face of the structure and away from the deformable impervious wall via a contact face;
each of the blocks of the first part has a non-contact face opposite that of the respective first block contact face;
each of the blocks of the first part has edges extending between the respective contact and non-contact first block faces;
each of the blocks of the second part is in contact with the deformable impervious wall and away from the face of the structure via a contact face;
each of the blocks of the second part has a non-contact face opposite that of the respective second block contact face;
each of the blocks of the second part has edges extending between the respective contact and non-contact second block faces; and
at ambient temperature, the edges of the blocks of the first part and those of the second part are in partial contact and have complementary shapes so as to form a substantially continuous layer of insulating material at a low temperature.

4. The insulating system of claim 3, wherein the deformable impervious wall is actuated toward the face of the structure due to a difference in pressure between an interior of the cryogenic tank and a space where the blocks of insulating materials are disposed.

5. The insulating system of claim 3, wherein the blocks of insulating materials are substantially parallelepipedal.

6. The insulating system of claim 3, wherein the first part of the blocks in contact with the face of the structure is adhesively bonded to said face of the structure.

7. The insulating system of claim 3, wherein the deformable impervious wall consists of a polymeric film.

8. The insulating system of claim 3, wherein the first part of the blocks of insulating materials forms a frame within which the second part of the blocks of insulating materials is inserted.

9. The insulating system of claim 3, wherein the contact faces of the blocks of the second part are bowed at ambient temperature, having a concave curvature with respect to the structure.

10. The insulating system of claim 3, wherein the structure of the tank has an impervious film in contact with which the first part of the blocks of insulating materials is disposed.

11. The insulating system of claim 3, wherein the system includes a pumping port designed to allow a vacuum to be created between the structure of the cryogenic tank and the deformable impervious wall.

12. The insulating system of claim 3, wherein the insulating system has flanges at its ends that connect the structure and the deformable impervious wall together.

13. The insulating system of claim 3, wherein the blocks of insulating materials are polygonal.

14. The insulating system of claim 3, wherein the deformable impervious wall is made of a polyimide.

15. The insulating system of claim 3, wherein, at low temperature, the blocks of the first and second parts form a substantially continuous single layer of insulating material.

\* \* \* \* \*